United States Patent [19]

Minagawa et al.

[11] 3,869,423
[45] Mar. 4, 1975

[54] ORTHO-SUBSTITUTED HYDROXYPHENYL ALKYLENE-CARBOXY-ALKYLENE-1,3,5-TRIAZINES AND ANTIOXIDANT AND SYNTHETIC RESIN COMPOSITIONS

[75] Inventors: Motonobu Minagawa, Koshigaya; Kuniaki Nomura, Ohmiya, both of Japan

[73] Assignee: Argus Chemical Corporation, Brooklyn, N.Y.

[22] Filed: Dec. 23, 1971

[21] Appl. No.: 211,751

[52] U.S. Cl...... 260/45.8 NT, 252/51.5 R, 252/403, 260/45.7 P, 260/45.7 S, 260/45.85 S, 260/45.85 R, 260/248 CS, 260/248 NS, 260/249.6, 260/249.8, 260/249.9
[51] Int. Cl. ...................... C08f 45/58, C08g 51/58
[58] Field of Search ............... 260/45.8 NT, 45.8 A

[56] References Cited
UNITED STATES PATENTS

| | | | |
|---|---|---|---|
| 2,564,646 | 8/1951 | Leistner et al..................... | 260/45.8 |
| 2,716,092 | 8/1955 | Leistner et al.............. | 260/45.75 R |
| 2,997,454 | 8/1961 | Leistner et al................. | 260/45.5 A |
| 3,678,047 | 7/1972 | Kletecka...................... | 260/45.8 NT |
| 3,709,884 | 1/1973 | Dexter et al................. | 260/45.8 NT |

*Primary Examiner*—Melvyn I. Marquis

[57] ABSTRACT

New ortho-substituted hydroxyphenyl alkylene carboxyalkylene-1,3,5-triazines are provided having the formula:

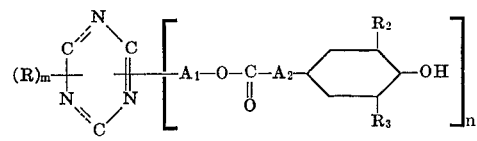

These phenolic 1,3,5-triazines are excellent antioxidants for synthetic resins, such as polypropylene, polyvinyl chloride, synthetic rubbers, and acrylonitrile-butadiene-styrene resins, as well as low and high molecular weight hydrocarbons.

9 Claims, No Drawings

ORTHO-SUBSTITUTED HYDROXYPHENYL ALKYLENE-CARBOXY-ALKYLENE-1,3,5-TRIAZINES AND ANTIOXIDANT AND SYNTHETIC RESIN COMPOSITIONS

Phenols have long been known as antioxidants capable of inhibiting oxidative deterioration of organic compounds having a carbon chain. The phenol evidently intercedes in some way in inhibiting oxidative attack upon the carbon chain, resulting in the formation of oxygenated compounds as well as chain scission. Simple phenols, bis-phenols and aminophenols have, for example, been widely used as antioxidants for hydrocarbon oils, which are characterized by a simple hydrocarbon molecule having a straight or branched chain, and a number of carbon atoms ranging from about 8 to about 30, and sometimes higher.

Such phenols are also known to be effective antioxidants in inhibiting the oxidative deterioration of synthetic resins containing a carbon chain. However, with the development of complex synthetic resin molecules, the simple phenols have been found to be insufficiently effective antioxidants for many of the commercial uses to which synthetic resins are put, and the result has been the development of multicomponent antioxidant or stabilizer systems, as well as more complex phenols, combining in the same molecule a phenol function and one or several other active organic groups. During the past ten years, the antioxidant art has undergone a remarkable development, leading to the preparation of ever more complex phenols.

For example, as shown by U.S. Pat. No. 3,487,044, patented Dec. 30, 1969, but based on an application filed Nov. 5, 1959, to Tholstrup, poly-α-olefins are commonly subjected to elevated temperatures during processing and the elevated temperatures increase the susceptibility of the polymer to oxidative degradation. Stabilizer systems accordingly are provided by Tholstrup composed of a diester of 3,3'-thiodipropionic acid and an alkylidene bisphenol or an alkylene bisphenol of the type:

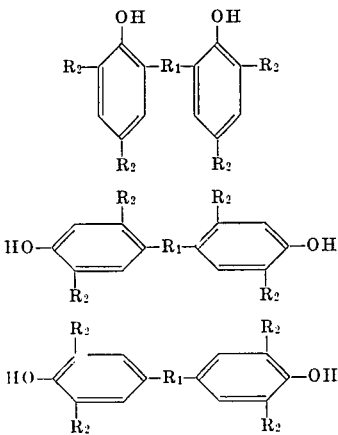

Contemporaneously, Doyle U.S. Pat. No. 3,378,518, patented Apr. 16, 1968, on an application filed Sept. 28, 1959, suggested polynuclear polyhydric phenols of the type:

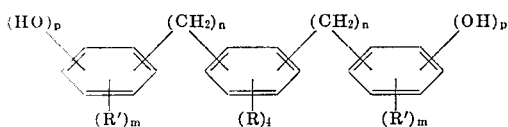

Jaffe U.S. Pat. No. 3,342,637, patented Sept. 19, 1967, suggested phenols of the structure.

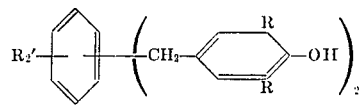

where in R and $R^1$ is an alkyl radical, preferably having up to eight carbon atoms.

Somewhat later, Dietzler U.S. Pat. No. 3,491,157, patented Jan. 20, 1970, suggested cycloalkyl-substituted cycloalkylidenebisphenols having a cycloalkylidene group in place of the alkylidene groups of the 4,4'-bisphenols of the Tholstrup patent.

Since the simple bisphenols were found to be inadequate in some respects, attention began to be directed to combining functions in the same molecule. Zaweski and Meltsner, U.S. Pat. No. 3,491,137, patented Jan. 20, 1970, suggested that dihydrocarbyl-hydrophenoxy-hydrocarbyl silanes were particularly effective antioxiants for organic compounds as well as polyolefins, and synthetic rubbers. These phenols include silicon and oxygen, sulfur, or imino groups in the molecule.

Meier and Dexter, U.S. Pat. No. 3,247,240, patented Apr. 19, 1966, provided phenols having the structure:

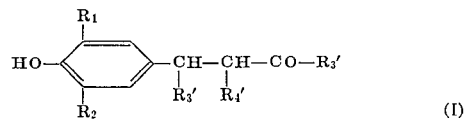

(I)

wherein
$R_1$ is a secondary or a tertiary alkyl group, preferably the teritiary (t or tert.) butyl group; other groups possible are, e.g., the isopropyl group, secondary (sec.) or tert. alkyl groups of 4 to 24 carbon atoms: butyl, amyl, hexyl heptyl, octyl, nonyl, decyl, undecyl, dodecyl, tridecyl, tetradecyl, pentadecyl, hexadecyl, heptadecyl, octadecyl, nonadecyl, cicosyl, heneicosyl, docosyl, tricosyl, tetracosyl, etc., $R_2$ is an alkyl group, preferably the tertiary butyl group; other groups possible are alkyl groups of 1 to 24 carbon atoms: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, cicosyl, heneicosyl, docosyl, triosyl, tetracosyl, etc., $R_3'$ and $R_4'$ are each independently hydrogen, alkyl, aryl-especially phenyl, acenaphthyl and naphthylalkaryl-especially alkylphenyl and polyalkylphenyl-alkaryl-especially alkylphenyl and polyalkylphenyl-aralkyl-especially benzyl-and carbalkoxy and $R_5$ is alkoxy, alkyl thioalkyloxy or alkyloxyalkyloxy amino alkylamino, dialkylamino, alkyl, aryl-especially phenyl, acenaphthyl or naphthylalkylaryl, arylalkyl, hydrogen and the group

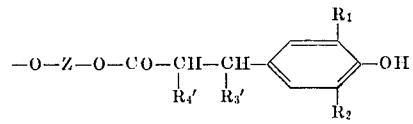

wherein Z is a straight or branched alkylene group, and $R_1$, $R_2$, $R_3'$ and $R_4'$ have the means described hereinabove.

Peterson and Dexter, U.S. Pat. No. 3,380,962, patented Apr. 30, 1968, provided phenols of the type:

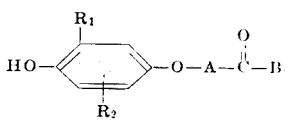

where A is alkylene group, and B is alkylimino, alkoxy, alkylthioalkoxy or another group of the type shown in the formula, linked by an alkylenethioalkylene group. The same inventors in U.S. Pat. No. 3,367,908, patented Feb. 6, 1968, provided phenols of the type:

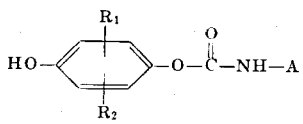

where A can be alkyl, or lower alkyphenyl, or another group as shown, linked by a phenylene group or a phenylenealkylenephenylene group.

Spivack and Dexter, U.S. Pat. No. 3,282,939, patented Nov. 1, 1966, and U.S. Pat. No. 3,338,833, patented Aug. 29, 1967, provided phenols having the structure:

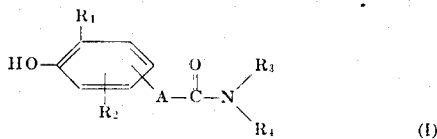

wherein

A is an alkylene group (straight or branched chain)- especially lower alkylene, i.e. having up to 6 carbon atoms, e.g. methylene, ethylene, propylene, butylene, pentylene, hexylene, with structures-such as $$-CH_2-, \quad -CH_2-CH_2-, \quad -\underset{CH_3}{\underset{|}{CH}}-, \quad -CH_2-\underset{CH_3}{\underset{|}{CH}}-CH_2-$$

$$-CH_2-\underset{CH_3}{\underset{|}{CH}}-, \quad -CH_2-CH_2-CH_2-, \text{ etc.:}$$

British U.S. Pat. No. 1,239,713, published July 21, 1971, provided phenols of the formula:

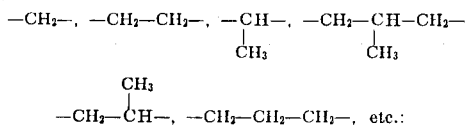

wherein

R$_1$ is an alkyl group containing from 1 to 8 carbon atoms or a cycloalkyl group containing from 5 to 12 carbon atoms;

R$_2$ is hydrogen, or an alkyl or cycloalkyl group as in R$_1$, and n is a number from 1 to 10.

The prepared compounds of the above type are of two kinds, 1) those wherein R$_1$ and R$_2$ are tertiary alkyl groups, and 2) those wherein R$_1$ and R$_2$ are alkyl groups having 1 to 4 carbon atoms and n is 4 to 8.

Steinberg, U.S. Pat. No. 3,598,854, patented Aug. 10, 1971, provided phenols of the formula:

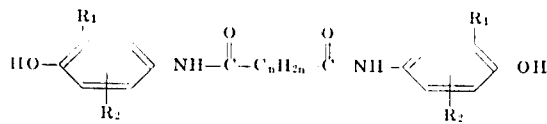

wherein x has a value of from 0 to 6; preferably 2 y has a value of from 1 to 6; preferably 2 p has a value of from 1 to 4, preferably 2 to 4

A is an alkyl or an alkylene group having from 1 to about 12 carbon atoms, preferably 2 to 6.

Phenols have also been provided that contain a hydroxyphenyl group attached to a heterocyclic ring. Such phenols were developed as a result of the discovery that copper accelerates the degradation of polyolefins, and that consequently polyolefins when used as coatings such as for instance electrical insulation on copper wires had a very short life. This led to the discovery that other heavy metal ions have the same catalytic effect.

Accordingly, Hensen U.S. Pat. No. 3,367,907, patented Feb. 6, 1968, proposed that azimidobenzenes and derivatives and phenotriazines and derivatives be combined with polyolefins to overcome this effect. These compounds have a carbocyclic benzene ring fused to a 5- or 6-membered heterocyclic ring containing three nitrogen atoms.

In U.S. Pat. No. 3,454,524, patented July 8, 1969, Hanson proposed that a hydroxy group be added to the benzene ring of substituted indoles of the same general type, but having only two nitrogen atoms at most in a 5-member heterocyclic ring fused to the benzene ring.

Spivack, Sterinberg and Dexter, U.S. Pat. No. 3,316,209, patented Apr. 25, 1967, suggested thiazoles of the type:

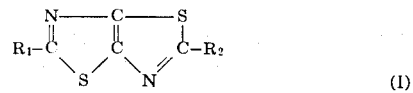

wherein

R$_1$ and R$_2$ each independently represent an alkyl-substituted hydroxyphenyl radical containing at least one alkyl group in ortho position to the hydroxyl group on the phenyl nucleus, the hydroxy group preferably being para to the carbon atom joining the phenyl nucleus and the thiazole nucleus.

Gordon, U.S. Pat. No. 3,368,997, patented Feb. 13, 1968, proposed that a phenolic hydroxy group be added to the central nitrogen atom of benzotriazole, and that this be used in combination with an ester of a hindered phenolic substituted lower alkanoic acid. These compounds, Gordon indicated, were particularly useful in protecting synthetic polymers such as poly-α-olefins, polyvinyl chloride and acrylonitrile-butadiene-styrene polymers as well as synthetic rubbers from the discoloration caused by exposure to light.

Giolito, U.S. Pat. No. 3,370,034, patented Feb. 20, 1968, introduced a phenolic hydroxyl group in the benzene ring of benzothioxole compounds of the type:

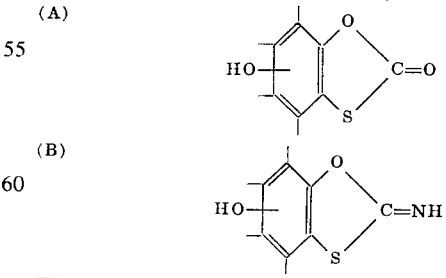

These also were indicated to be light stabilizers.

Dressler and Reabe, U.S. Pat. No. 3,389,004, patented June 18, 1968, indicates that 3-salicyloylcarbazoles were useful light stabilizers for synthetic resins. These compounds have the structure

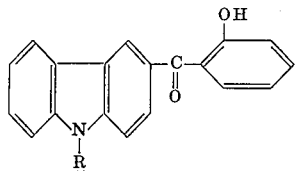

Bloom and Newland, U.S. Pat. No. 3,391,106, patented July 2, 1968, indicated that imino-4-thiazolines having a hydroxy phenyl group attached to one of the carbons thereof, or to the imino nitrogen, or to the ring nitrogen, were effective light stabilizers.

Dexter, Knell and Roskin, No. 3,156,690, patented Nov. 10, 1964, and No. 3,202,681, patented Aug. 24, 1965, proposed a series of triazines of the following type:

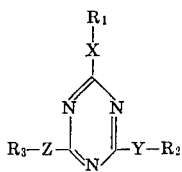

$R_1$ and $R_2$ can each be substituted hydroxyphenyl, and $R_3$ can be hydroxyphenyl or substituted hydroxyphenyl. X, Y and Z can be —S—, —O—, or —NR$_4$, is aralkyl.

Pines, U.S. Pat. No. 3,418,272, patented Dec. 24, 1968, indicated that N,N'-tetrasubstituted alkylenediamines and oxyalkylenediamines were good clarifiers for polypropylene and high and low density polyethylene, and could be used with antioxidants of the phenolic type, as well as thermal and oxidative stabilizers have phenolic groups. One class of such auxiliary stabilizers were respresented by the formula:

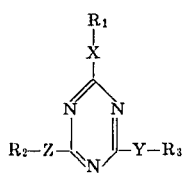

(II)

In these compounds, $R_3$ can be alkylhydroxyphenyl, and X, Y and Z are oxygen, sulfur, imino or substituted imino. Another class of phenolic stabilizers have the formula:

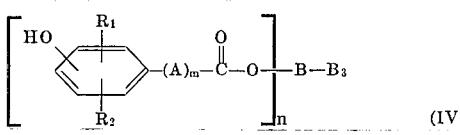

(IV)

In accordance with the invention, ortho-substituted hydroxyphenyl-alkylene-carboxyalkylene-1,3,5-triazines are provided that are useful as antioxidants and as light stabilizers for organic compounds, and particularly synthetic polymers having a carbon chain, such as synthetic rubbers, poly-α-olefins, polyvinyl chloride and acrylonitrile-butadiene-styrene copolymers, as well as hydrocarbons of both low and high molecular weight. The compounds are compatible with other stabilizers for such materials, and can be used in combinations therewith which can evidence synergistic effects, particularly when the auxiliary stabilizer is an organic phosphite, thiodipropionic acid, ester, or salt, or a polyvalent metal salt of an organic nonnitrogenous aliphatic or cycloaliphatic carboxylic acid.

The hydroxyphenyl-1,3,5-triazines of the invention are defined by the following general formula:

I. 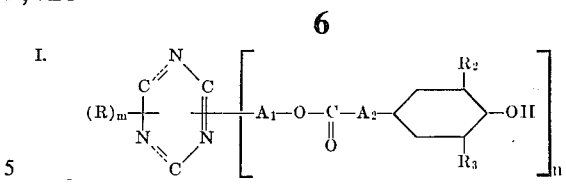

In this formula:

$n$ is an integer from 1 to 3.

$m$ is an integer from 0 to 3.

$A_1$ is selected from the group consisting of alkylene having from one to about four carbon atoms and alkyl alkylene, the alkyl having from one to fourteen carbon atoms, and the alkylene having from one to four carbon atoms, and imino NHA$_1$. Those compounds in which $A_1$ is linked to carbon of the 1,3,5-triazine ring are novel.

$A_2$ is alkylene having from one to about four carbon atoms.

$R_2$ and $R_3$ are selected from the group consisting of hydrogen and alkyl having from one to about four carbon atoms. $R_2$ is ortho to the hydroxyl, and $R_3$ can be ortho or meta to the hydroxyl.

R is linked to either carbon or nitrogen, but in any given triazine all the R groups are linked either to carbon or to nitrogen. When linked to carbon, R is selected from the group consisting of oxo, alkyl, aryl, cycloalkyl and hydroxyalkyl, and NHR$_1$ being selected from the group consisting of alkyl, cycloalkyl or hydroxyalkyl. When the R groups are linked to nitrogen, R is selected from the group consisting of alkyl, cycloalkyl, aryl and hydroxy aryl.

The R alkyl groups have from one to about eighteen carbon atoms. The R cycloalkyl groups have from three to about eight ring carbon atoms, and any remaining carbon atoms are in alkyl substituents attached to the ring. The R aryl groups have six carbon atoms, ten carbon atoms, and fourteen carbon atoms.

The alkylene carboxyalkylene hydroxyphenyl group can be attached either to carbon or to nitrogen, but in any 1,3,5-triazine all of such groups are attached either to carbon or to nitrogen.

In the case where the $A_1$ substituent is NHA$_1$, the compounds have the formula:

II. 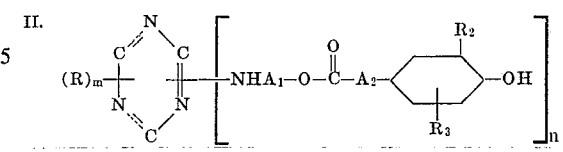

In the above formula, the various groups are as identified above.

When the R and alkylene carboxyalkylene hydroxyphenyl groups are all attached to carbon, the compounds have the formula:

III. 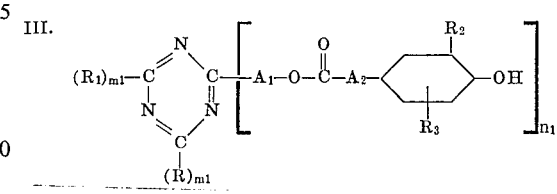

$m_1$ is 0, 1, or 2, and $n_1$ is an integer from 1 to 3, the total of $n_1$ and $m_1$ substituents attached to the triazine ring being three.

When the R and alkylene carboxyalkylene hydroxyphenyl groups are all attached to nitrogen, the compounds have the formula:

IV. 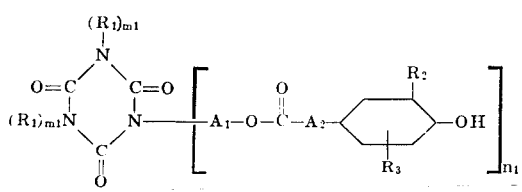
$m_1$ is 0, 1, or 2, and $n_1$ is 1, 2, or 3, the total of $m_1$ and $n_1$ attached to any triazine ring being three.
Exemplary compounds falling within the invention are the following:
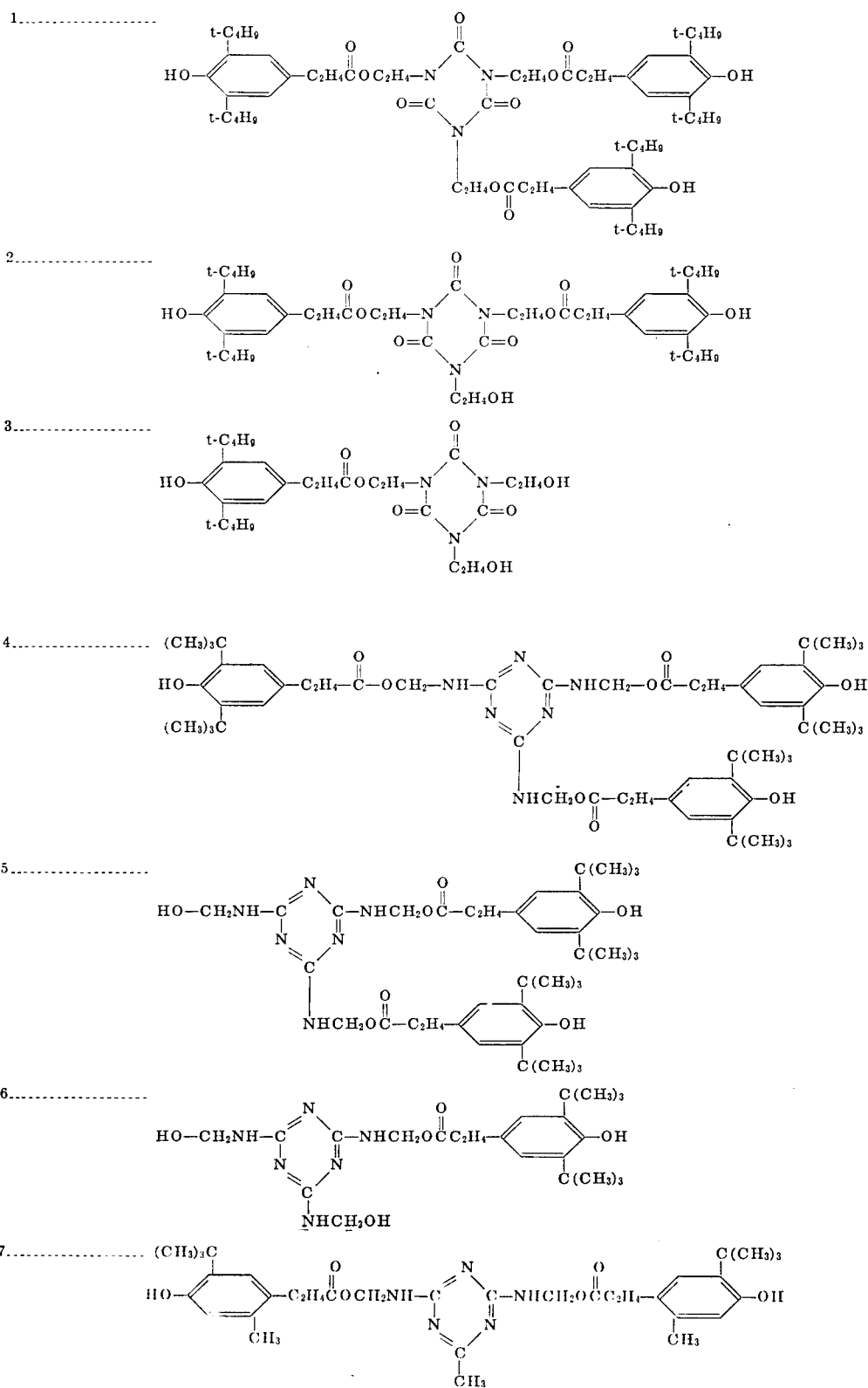

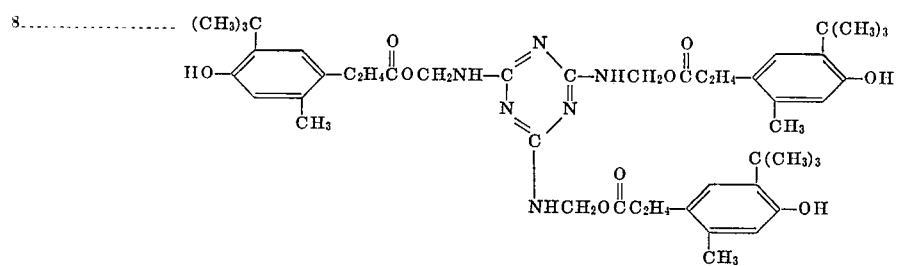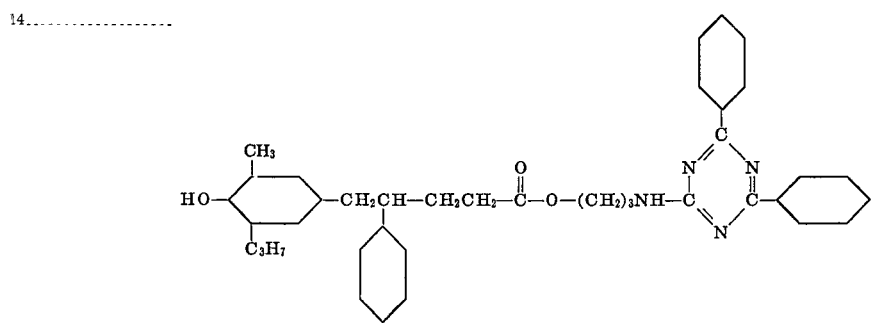

These compounds are readily prepared by conventional reactions:

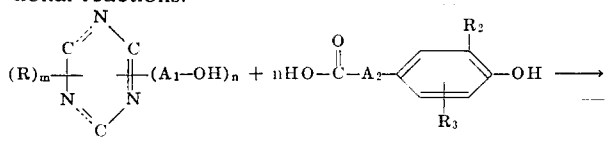

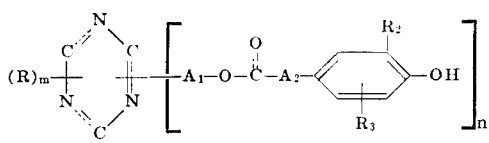

or

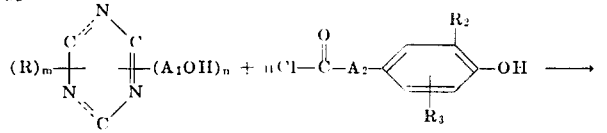

or

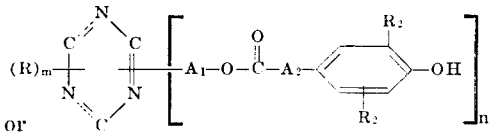

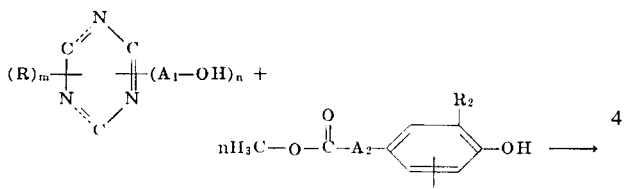

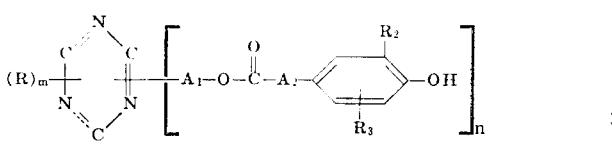

The following examples illustrate the process for preparing the ortho-substituted hydroxyphenyl alkylene carboxyalkylene-1,3,5,-triazines of the invention:

EXAMPLE A

In a round-bottomed flask equipped with a mechanical stirrer were placed 13.1 g(0.05 mole) of tris-(2-hydroxyethyl) isocyanurate, 44.5 g(0.16 mole) of (3,4-di-tert-butyl-4-hydroxy) phenyl propionic acid, 100 ml of xylene, and 1.5 percent of p-toluenesulfonic acid.

The mixture was allowed to reflux for six hours. At the end of reaction, xylene as solvent was distilled off under reduced pressure, using a water pump.

The glassy solid obtained was dissolved in ether again and excess (3,5-di-tert-butyl-4-hydroxy)phenyl propionic acid was neutralized by the use of 10 percent sodium bicarbonate solution. The ethereal solution was washed with water and was dried over anhydrous sodium sulfate and the ether was distilled.

The crude product was crystallized from n-hexane. After drying, the product melted at 91.5°-92.5°C. and weighed 49.03 g(94.2 percent).

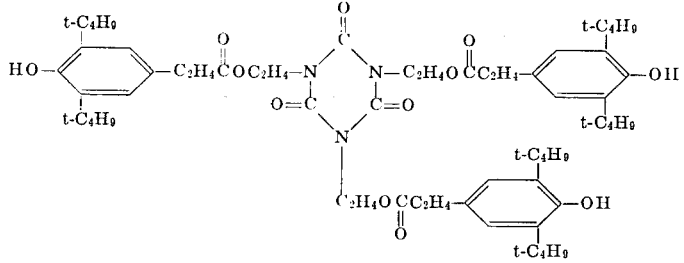

EXAMPLE B

A mixture of 0.1 mole of tris(2-hydroxyethyl)isocyanurate, 0.2 mole of (3,5-di-tert-butyl-4-hydroxy)phenyl propionic acid, 50 ml of xylene and 1.5 percent of p-toluene sulfonic acid was allowed to reflux for six hours.

After the reaction, the procedure for purification of product was as in Example A.

The yield was 68.5 g(87.8 percent) of light colored glassy solid, melting at 115°-123°C.

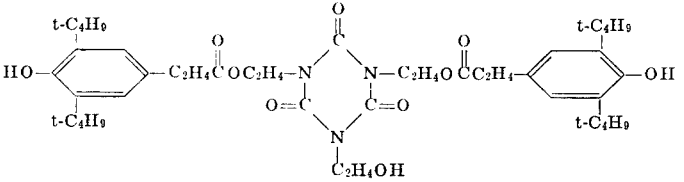

EXAMPLE C

A mixture of 0.1 mole of tris (2-hydroxyethyl)isocyanurate, 0.2 mole of (3,5-di-tert-butyl-4-hydroxy)phenyl propionic acid, 50 ml of xylene and 1.5 percent of p-toluene sulfonic acid was placed in a round-bottomed flask equipped with a reflux condenser and was boiled for six hours.

The procedure for purification was the same as Example A. A glassy solid was obtained, melted at 125°-135°C. The yield was 46.5 g(89.8 percent).

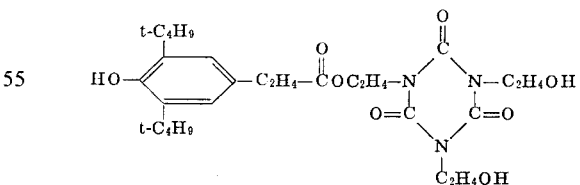

EXAMPLE D

A reaction vessel was charged with 10.8 g(0.05 mole) tris-hydroxymethylmelamine (10.8 g) and 0.15 mole of (3,5-di-tert-butyl-4-hydroxy)phenyl propionic chloride, and 100 ml of pyridine.

The vessel was surrounded by an ice bath, and the temperature was held at 0°-5°C. The stirring was continued for about 5-6 hours.

At the end of reaction, the mixture was poured into 0.1 l of cold water and the product was extracted by ether. The ethereal solution was washed with water twice and was dried over by anhydrous sodium sulfate and the ether was distilled. The crude product was crystalline, and melted at 98.5°–104.5°C. The yield was 45.2 g(89.7 percent of the theoretical amount).

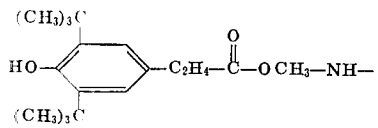

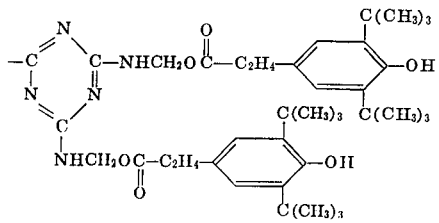

EXAMPLE E

A mixture of 0.1 mole of trimethylol melamine, 0.2 mole of (3,5-di-tert-butyl-4-hydroxy)phenyl propionic chloride, and 100 ml of pyridine was stirred for about 5-6 hours at 0°–5°C.

After the reaction, the procedure for purification of product was as in Example D.

The yield was 64.5 g(87.8 percent) of slightly colored solid, melting at 99.5°–107°C.

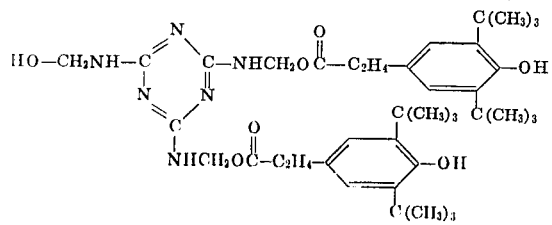

EXAMPLE F

A mixture of 0.1 mole of trimethylol melamine, 0.1 mole of (3,5-di-tert-butyl-4-hydroxy)phenyl propionic chloride and 0.1 l of pyridine was stirred for about 5–6 hours, at 0°–5°C.

At the end of reaction, the procedure for purification was in Example D.

The yield was 41.0 g(86.2 percent) of slightly colored solid, melting at 110°–125°C.

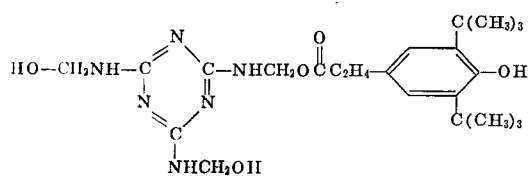

EXAMPLE G

A mixture of 0.1 mole of dimethylol benzoguanamine, 0.2 mole of (3-tert-butyl-5-methyl-4hydroxy)-phenyl propionic chloride, and 100 ml of pyridine was stirred for about 5–6 hours, at 0°–5°C.

The reactant was poured into cold water and was extracted by ether. The ether was distilled.

The crude product was washed with petroleum ether. The product melted at 87.5°–90.5°C.; the yield was 62.3 g(91.2 percent).

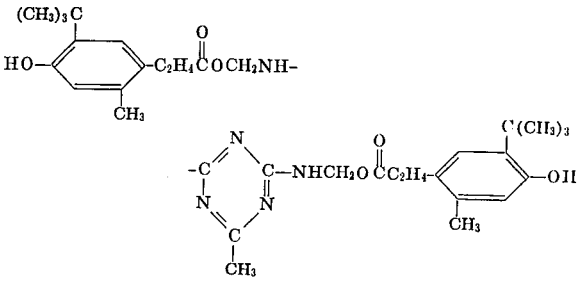

EXAMPLE H

A reaction vessel was charged with 0.1 mole of trimethylol melamine, 0.3 mole of (3-tert-butyl-5-methyl-4-hydroxy) phenyl propionic chloride, and 100 ml of pyridine. The mixture was stirred for about 5–6 hours, at 0°–5°C.

The crude product was purified by the method of Example D.

The product melted at 88.5°–91.5°C.; the yield was 81.4 g(93.3 percent).

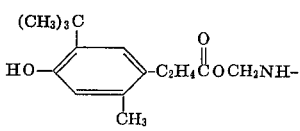

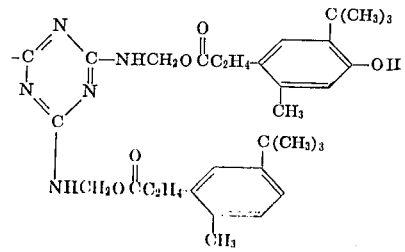

EXAMPLE I

A mixture of 0.1 mole of tris(2-hydroxyethyl)isocyanurate, 0.3 mole of (3-tert-butyl-5-methyl-4-hydroxy)phenyl propionic acid, 100 ml of xylene and 1.5 percent of p-toluenesulfonic acid was refluxed for about 6 hours.

The procedure for purification was as in Example A.

The melting point of the crystalline white powder was 83.5°–85.0°C.; the yield was 84.2 g(92 percent).

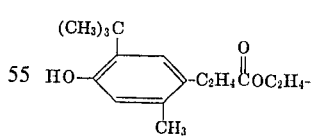

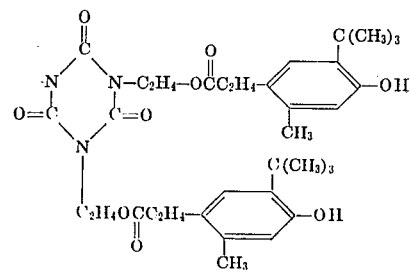

The hydroxyphenyl-1,3,5-triazines of the invention are effective antioxidants for any organic compound having a hydrocarbon chain. Thus, hydrocarbon fuels, such as gasoline, kerosene, jet fuel, and fuel oil, have an increased resistance to oxidative deterioration when a compound of the invention is incorporated therein. Hydrocarbon fuels containing organometallic additives, such as tetraethyl lead and tetramethyl lead, also have increased oxidative stability. Lubricating oils and functional fluids derived from naturally-occurring hydrocarbons as well as synthetic lubricating oils and functional fluids also have their resistance to oxidation increased by the antioxidants of the invention.

The antioxidants of the invention are particularly effective in synthetic polymers having a carbon chain backbone, such as poly-α-olefins, synthetic rubbers, polyvinyl chloride, acrylonitrile-butadiene-stryene polymers, and natural and synthetic rubber.

When used with synthetic polymers, the antioxidants of the invention can be employed in combinations with other synthetic polymer stabilizers. Combinations of stabilizers can be complementary, and can even display an enhanced or synergistic effect in improving the resistance of the polymer to oxidative deterioration.

The compounds of the invention are particularly versatile in that they enhance the resistance to oxidative deterioration not only when induced by heat, i.e., thermal degradation, but also when induced by light, and particularly ultra-violet light. It is thought that this combined effectiveness is the result of combining the phenolic group and the 1,3,5-triazine group in the same molecule; but the compounds of the invention in fact may display a higher effectiveness in these regards than either a phenol or a 1,3,5-triazine alone, used in the same amounts. Evidently, therefore, the alkylene carboxyalkylene group also imparts a further stabilizing effectiveness to the molecule.

Stabilizer systems of the invention comprising an antioxidant of the invention and one or more synthetic polymer stabilizers can be formulated and marketed as such. An inert organic solvent can be used to facilitate handling, if the ingredients do not form a homogeneous mixture or solution. A variety of synthetic polymer stabilizers can be employed, of which the following are exemplary:

The organic phosphite can be any organic phosphite having one or more organic radicals attached to phosphorus through oxygen. These radicals can be monovalent radicals in the case of the triphosphites, diphosphites and monophosphites, which can be defined by the formula:

$$R_1-O-P-O-R_3$$
$$|$$
$$O$$
$$|$$
$$R_2$$

in which $R_1$, $R_2$ and $R_3$ are selected from the group consisting of hydrogen, alkyl, alkenyl, aryl, alkaryl, aralkyl, and cycloalkyl groups having from one to about thirty carbon atoms.

Also included are the organic phosphites having a bivalent organic radical forming a heterocyclic ring with the phosphorus of the type:

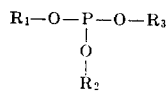

in which $R_4$ is a bivalent organic radical selected from the group consisting of alkylene, arylene, aralkylene, alkarylene and cycloalkylene radicals having from two to about thirty carbon atoms, and $R_5$ is a monovalent organic radical as defined above in the case of $R_1$, $R_2$ and $R_3$.

Also useful in the compositions of the invention are mixed heterocyclic-open chain phosphites of the type:

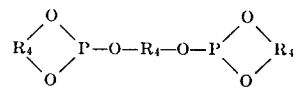

More complex phosphites are formed from trivalent organic radicals, of the type:

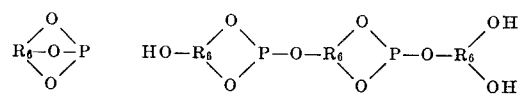

in which $R_6$ is a trivalent organic radical of any of the types of $R_1$ to $R_5$, inclusive, as defined above.

An especially preferred class of organic phosphites have a bicyclic aromatic group attached to phosphorus through oxygen, with no or one or more phenolic hydroxyl groups on either or both of the aromatic rings. These phosphites are characterized by the formula:

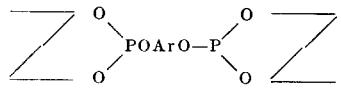

or

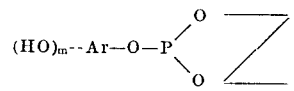

in which Ar is a mono or bicyclic aromatic nucleus and m is an integer of from 0 to about 5.

Z is one or a plurality of organic radicals as defined above for $R_1$ to $R_6$, taken singly or together in sufficient number to satisfy the valences of the two phosphite oxygen atoms.

Z can also be hydrogen, and can include additional bicyclic aromatic groups of the type $(HO)_m-Ar$.

The term "organic phosphite" as used herein is inclusive of the above-described mono-, di- and triphosphites. Usually, the phosphite will not have more than about sixty carbon atoms.

Exemplary are monophenyl di-2-ethylhexyl phosphite, diphenyl mono-2-ethylhexyl phosphite, diisooctyl monotolyl phosphite, tri-2-ethylhexyl phosphite, phenyl dicylohexyl phoshpite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl) phosphite, benzyl methyl isopropyl phosphite, butyl dicresyl phosphite, isooctyl di(octylphenyl) phosphite, di(2-ethylhexyl) (isooctylphenyl) phosphite, tri(2-cyclohexylphenyl) phosphite, tri-α-naphthyl phosphite, tri(phenylphenyl) phosphite, tri(2-phenyl ethyl) phosphite, monododecyl phosphite, di(p-tert-butyl-phenyl) phosphite, decyl phenyl phosphite, tert-butyl-phenyl 2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy-5,5-dimethyldioxaphosphorinane, 2-cyclohexyloxy-5,5-diethyl-dioxaphosphorinane, monophenyl phosphite, 2-ethylhexyl phosphite, isooctyl phosphite, cresyl phosphite, t-octylphenyl phosphite, t-butyl phosphite, diphenyl phosphite, di-isooctyl phosphite, dicresyl phosphite, dioctylphenyl phosphite, didodecyl phosphite, di-α-naphthyl phosphite, ethylene phosphite, butyl cresyl phosphite, phenyl-mono-2-ethylhexyl phosphite, isooctyl monotolyl phosphite and phenyl cyclohexyl phosphite.

Exemplary of the bias aryl phosphites are: bis(4,4'-thio-bis(2-tertiary butyl-5-methyl-phenol)) isooctyl phosphite, mono(4,4'-thio-bis(2-tertiary-butyl-5-methyl-phenol)) di-phenyl phosphite, tri-(4,4'-n-butylidene-bis(2-tertiary-butyl-5-methyl-phenol)) phosphite, (4,4'-benzylidene-bis(2-tertiary-butyl-5-methyl-phenol)) diphenyl phosphite, isoctyl 2,2'-bis(-parahydroxyphenyl) propane phosphite, tridecyl 4,4'-n-butylidene-bis(-2-tertiary butyl-5-methyl-phenol) phosphite, 4,4'-thiobis(2-tertiary butyl-5-methyl-phenol) phosphite, 2-ethylhexyl-2,2'-methylene-bis(4-methyl-6-1'-methylcyclohexyl) phenol phosphite, tri-(2,2'-bis-(parahydroxy phenyl) propane) phosphite, tri(4,4'-thio-bis(2-tertiary-butyl-5-methyl-phenol) phosphite, isooctyl-(2,6-bis(2'-hydroxy-3,5-dinonylbenzyl)-4-nonyl-phenyl)) phosphite, tetra-tridecyl 4,4'-n-butylidene-bis(2-tertiary butyl-5-methyl-phenyl) diphosphite, tetra-isooctyl-4,4'-thiobis(2-tertiary-butyl-5-methyl-phenyl) diphosphite, 2,2'-methylenebis(4-methyl-6-1'-methyl-cyclo-hexyl-phenyl) polyphosphite, isooctyl14,4'-isopropylidene-bis-phenyl-polyphosphite, 2-ethylhexyl-2,2'-methylene-bis(4-methyl-6,1'-methyl-cyclohexyl) phenyl triphosphite, tetra-tridecyl-4,4'-oxydiphenyl-diphosphite, tetra-n-dodecyl-4,4'-butylidenebis-(2-tertiary-butyl-5-methylphenyl) diphosphite, tetra-tridecyl-4,4'-isopropylidene-bisphenyl-diphosphite, hex-tridecyl-butane-1,1,3-tris(2'-methyl-5'-tertiary-butylphenyl-4'-) triphosphite.

The thiodipropionic acid ester has the following formula:

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl, mixed alkyl aryl, and mixed alkyl cycloalkyl radicals; and esters thereof with aliphatic carboxylic acids; and Y is selected from the group consisting of a) hydrogen, b) a second R radical $R_2$, which can be the same as or different from the $R_1$ radical, c) a polymeric chain of n thiodipropionic acid ester units:

$$R_1O[OCCH_2CH_2SCH_2CH_2COOXO]_nOCCH_2CH_2-S-CH_2CH_2COOZ$$

where Z is hydrogen, $R_2$ or M; $n$ is the number of thiodipropionic acid ester units in the chain; and X is a bivalent hydrocarbon group of the type of $R_1$; the value of n can range upwards from 1, but there is no upper limit on $n$ except as is governed by the ratio of carbon atoms to sulfur atoms as stated below; and d) a polyvalent metal M of Group II of the Periodic Table such as zinc, calcium, cadmium barium, magnesium and strontium.

The molecular weights of the R and Y radicals are taken such that with the remainder of the molecule, the thiodipropionic ester has a total of from about ten to about sixty carbon atoms per sulfur atom.

Accordingly, the various thiodipropionic acid ester species coming within the above-mentioned categories within the general formula can be defined as follows:
a. $R_1OOCCH_2CH_2SCH_2CH_2COOH$
b. $R_1OOCCH_2CH_2SCH_2CH_2COOR_2$
c. $R_1O[OCCH_2CH_2SCH_2CH_2COOX-O]_nOCCH_2CH_2SCH_2CH_2COOZ$
d. $[R_1OOCCH_2CH_2SCH_2CH_2COO]_2M$ In the above formulae $R_1$ and $R_2$, M, X, and Z are the same as before. In the polymer c), as in the other forms of thiodipropionic acid esters, the total number of carbon atoms per sulfur atoms is within the range from about ten to about sixty.

The R radical of these esters is important in furnishing compatibility with the synthetic polymer. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described below.

The aryl, alkyl, alkenyl and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,2-propylene,

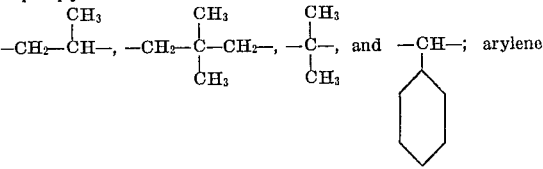

radicals such as phenylene

methylenephenylene

dimethylene phenylene,

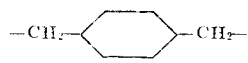

and alicyclene radicals such as cyclohexylene

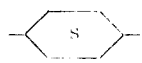

and cyclopentylene

As exemplary of the thiodipropionic acid esters which can be used, there can be mentioned the following: monolauryl thiodipropionic acid, dilauryl thiodipropionate, butyl stearyl thiodipropionate, di(2-ethylhexyl)-thiodipropionate, diisodecyl-thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds, but where they are not available, they are readily prepared by esterification of thiodipropionic acid and the corresponding alcohol.

When the compound is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic nonnitrogenous monocarboxylic acid having from six to twenty-four carbon atoms. The aliphatic, aromatic, alicyclic and oxygencontaining heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, capric acid, undecylic acid, lauric acid, myristic acid, palmitic acid, margaric acid, stearic acid, oleic acid, ricinoleic acid, benhenic acid, chlorocaproic acid, hydroxy capric acid, benzoic acid, phenylacetic acid, butyl benzoic acid, ethyl benzoic acid, propyl benzoic acid, hexyl benzoic acid, salicylic acid, naphthoic acid, 1-naphthalene acetic acid, orthobenzoyl acid, naphthenic acids derived from petroleum, abietic acid, dihydroabietic acid, hexahydrobenzonic acid, and methyl furoic acid.

The water-insoluble salts are preferred, because they are not leached out when the plastic is in contact with water. Where these salts are not known, they are made by the usual types of reaction, such as by mixing the acid or anhydride with the corresponding oxide or hydroxide of the metal in a liquid solvent, and heating, if necessary, until salt formation is complete.

The hydrocarbon sulfides and polysulfides can contain one sulfur atom or two or more sulfur atoms linked in a polysulfide unit. Usually, the sulfides and polysulfides will not have more than fifty carbon atoms. They can be defined by the formula:

$$R(S)_n-R$$

wherein $n$ is the number of sulfur atoms and ranges from one to about six, and R is an organic radical having from one to about thirty carbon atoms, such as alkyl, aryl, alkaryl, aralkyl, and cycloalkyl. The following compounds are typical: dibutyl sulfide, didecyl sulfide, diphenyl sulfide, dibenzyl sulfide, butyl octyl sulfide, di-n-dodecyl trisulfide, di-tertiary dodecyl disulfide, di-para-tertiary butyl phenyl trisulfide, dibenzyl disulfide, dibenzyl tetra sulfide, and dibenzyl trisulfide.

The amount of total stabilizer including the synthetic polymer stabilizer and the antioxidant of the invention is generally 0.01 to 5 percent. Of this, the synthetic polymer stabilizer comprises from about 0.005 to about 4 percent by weight, and the antioxidant of the invention from about 0.001 to about 5 by weight. The preferred olefin polymer stabilizer comprises from about 0.005 to about 1 percent of the antioxidant, from about 0.01 to about 1 percent of a thiodipropionic acid ester, and optionally, from about 0.05 to about 1.25 percent of a phosphite, and from about 0.025 to about 0.75 percent of a polyvalent metal salt, when present.

Polypropylene solid polymer can be defined in a manner to differentiate it from other polyolefins as having a density within the range of from 0.86 to 0.91, and a melting point about 150°C. The antioxidant of the invention is applicable with all such polypropylenes, as distinguished from polypropylenes in the liquid form or in semiliquid or gel-like forms, such as are used as greases and waxes.

The antioxidant and the stabilizer systems of the invention are applicable to polypropylenes prepared by any of the various procedures, for the molecular weight and tacticity are not factors affecting this stabilizer. Isotactic polypropylene, available commercially under the trade names Profax, Escon and Olefane and having a softening or hot-working temperature of about 350°F., is an example of a sterically regular polypropylene polymer.

Mixtures of polypropylene with other compatible polymers and copolymers of propylene with copolymerizable monomers also can be improved in accordance with this invention. For example, mixtures of polyethylene and polypropylene, and copolymers of propylene and ethylene which contain a sufficient amount of propylene to present the instability problem that is resolved by the antioxidants of the invention, may be improved by the addition of one or more of the antioxidants of the invention, alone or in combination with other polypropylene stabilizers.

The stabilizer systems of the invention may also be used with poly-α-olefins higher than polypropylene, such as polybutylene and polyisobutylene, as well as both low density and high density polyethylene.

The antioxidants of the invention and stabilizer systems including the same are incorporated in the polymer in suitable mixing equipment, such as a mill or a Banbury mixer. If the poly-α-olefin has a melt viscosity which is too high for the desired use, the poly-α-olefin can be worked until its melt viscosity has been reduced to the desired range before addition of the stabilizer. However, poly-α-olefins in a range of workable melt viscosities are now available. Mixing is continued until the mixture is substantially uniform. The resulting composition is then removed from the mixing equipment and brought to the size and shape desired for marketing or use.

The stabilized poly-α-olefin can be worked into the desired shape, such as by milling, calendering, extrusion or injection-molding or fiber-forming. In such operations, it will be found to have a considerably improved resistance to reduction in melt viscosity during the heating, as well as a better resistance to discoloration and embrittlement on ageing and heating, and upon exposure to light.

The following examples represent preferred embodiments of poly-α-olefin compositions containing antioxidants in accordance with the invention.

EXAMPLES 1 TO 5

Polypropylene compositions were prepared, stabilized by an antioxidant compound of the invention, and were evaluated for their resistance to oxidative degradation at 150°C., and upon exposure to ultraviolet light.

The base olefin polymer composition tested was as follows:

|  | Parts by Weight |
|---|---|
| Polypropylene (Profax 6501) | 100 |
| Antioxidant | 0.4 |

The components listed were mixed on a two-roll mill, and sample 0.5 mm sheets molded in a hot press. The sheets were heated at 150°C. until noticeable degradation set in. The resistance to ultraviolet light degradation was determined by subjecting the sheets to fluorescent light in air at 47°–48°C. for 64 hours. Yellowness was determined using a Hunter colorimeter and reflectometer.

Table I below sets out the results of the tests:

TABLE I

| Example number | Antioxidant | Hours to failure | Initial color | Yellowness after 64 hours |
|---|---|---|---|---|
| Control A | None | 720 | Colorless | 0.48 |
| Control B | Irganox 1076 (n-octadecyl (di-tert-butyl-hydroxyphenyl) propionate) | 456 | Light yellow | 0.17 |
| Control C | Irganox 1010 (pentaerythritol(di-tert-butyl-hydroxyphenyl)propionate) | 706 | Yellow | 0.22 |
| 1 | (structure) | 986 | Colorless | 0.15 |
| 2 | (structure) | 924 | do | 0.13 |
| 3 | (structure) | 878 | do | 0.13 |

Table 1 — Continued

| Example number | Antioxidant | Hours to failure | Initial color | Yellowness after 64 hours |
|---|---|---|---|---|
| 4 | (structure: bis-phenolic triazine derivative with t-butyl and methyl substituents) | 950 | Slight yellow | 0.12 |
| 5 | (structure: tris-phenolic triazine derivative with t-butyl and methyl substituents) | 918 | Colorless | 0.15 |

The improvement in the resistance of the polypropylene to oxidative degradation induced by heat and light is evident.

The antioxidants of the invention are also useful stabilizers for acrylonitrile-butadiene-styrene polymers, as a class. Many of the ABS polymers available commercially are prepared by dispersing an elastomeric phase such as a diene homopolymer such as polybutadiene into a rigid styrene-acrylonitrile copolymer or a terpolymer. The elastomeric phase can also be a copolymer with styrene or acrylonitrile, or a styrene acrylonitrile graft on an elastomeric substrate, such as polybutadiene. The contribution of each of the acrylonitrile, styrene and butadiene is important. Terpolymers of the three monomers do not always have the desired properties, and ABS graft copolymers are most common, and include a styrene-acrylonitrile copolymer phase and a performed polybutadiene substrate on which is grafted styrene and acrylonitrile, usually by emulsion, bulk or suspension polymerization. See Chemistry and Industry, Aug. 13, 1966, pp. 1399–1405. All of these are encompassed herein under the terms "acrylonitrile-butadiene-styrene polymer," or "ABS polymer."

ABS polymers generally contain from about 15 to about 35 percent acrylonitrile, from about 5 to about 35 percent butadiene, and from about 40 to about 80 percent styrene, by weight. The matrix usually has a molecular weight of from about 200,000 to about 450,000 or more, and a density of from about 0.99 to about 1.09.

The acrylonitrile portion of the ABS polymer imparts chemical resistance to the polymer; the styrene portion of the ABS polymer imparts good fabrication characteristics to the polymer; and the rubber or butadiene portion of the ABS polymer provides rubberiness and toughness to the polymer. Accordingly, chemical resistance, good fabrication characteristics, and rubberiness and toughness features can be varied in any given ABS polymer by varying the quantities of the acrylonitrile, butadiene and styrene. For example, the impact strength of the ABS polymer can be increased by increasing the amount of butadiene in the polymer. However, increase in impact strength is accompanied by slight reduction in heat resistance, rigidity, electrical properties and some of the other strength properties.

Heat resistance of the ABS polymer can be improved by increasing the amount of acrylonitrile in the polymer. However, increased heat resistance, such as high heat-distortion temperature, usually is accompanied by decreased impact strength, especially at low temperatures.

The antioxidants of the invention are effective in improving heat resistance of ABS polymer without deleterious effect on other physical properties. These antioxidants improve ABS polymer prepared by polymerizing acrylonitrile monomer and styrene monomer in a previously prepared polybutadiene latex, or butadiene copolymer rubber latex, under such conditions that an appreciable portion of the acrylonitrile and styrene become grafted or polymerized directly on the polybutadiene molecules, as in U.S. Pat. No. 2,820,773, dated Jan. 21, 1958, to Childers and Fisk. They are also effective with ABS polymer prepared by blending styrene-acrylonitrile copolymer resins with butadiene-based elastomers, such as is described in U.S. Pat. No. 2,439,202, dated Apr. 6, 1948, to Daly, and U.S. Pat. No. 2,600,024, dated June 10, 1952, to Romeyn et al., and with ABS graft copolymer blends of all types containing a sufficient amount of ABS polymer to present the heat stability problem alleviated by the antioxidants of the invention, such as blends with styrene-acrylonitrile resin, or nitrile copolymer rubber, as in U.S. Pat. No. 2,802,808, dated Aug. 13, 1957, to Hayes.

ABS polymers are conventionally blended with additives such as fillers, pigments and lubricants. Appropriate pigments and fillers are, for example, flour, cotton, shredded or chopped cloth, talc, chopped canvas, paper pulp fibers, asbestos, powdered mica, calcium carbonate, carbon, graphite, quartz, diatomaceous earth, silica, fibrous glass, barytes, calcium silicate, iron, barium sulfate, litharge, clay and titanium dioxide. Fillers are normally used in an amount of from about 2 to about 40 percent by weight of the polymer. Typical lubricants are mineral oil, natural and synthetic waxes, fatty acids such as stearic acid, alkaline earth and heavy metal stearates, and aliphatic alcohols, ketones, and epoxides having from about sixteen to about sixty carbon atoms in the molecule, including stearyl alcohol, palmitone, behenone, oleone, cetyl palmitate, 1,2-epoxydocosane, and isooctyl epoxystearate, in amounts of from about 0.2 to 3 percent of the polymer.

A sufficient amount of the antioxidants of the invention is used to enhance the resistance of the ABS polymer against discoloration upon exposure to elevated temperatures. Small amounts are usually adequate. Amounts within the range from about 0.1 to about 10 percent by weight of the ABS polymer are satisfactory. Preferably, from about 0.25 to about 2 percent is employed for optimum stabilization.

The stabilizer composition can be formed by simply mixing the individual ingredients in the dry state or in a suitable liquid medium. It is frequently helpful to combine the antioxidant with solvent and water. Another helpful expedient is to prepare the stabilizer composition in the form of an aqueous emulsion. Such an emulsion can be added to a freshly made ABS polymer latex before the polymer is isolated from the latex by the usual procedures of coagulation or spray-drying. A "masterbatch" technique can be utilized to provide both wet and dry combinations of the stabilizer composition with the ABS polymer in proportions for compounding into larger quantities of polymer to be stabilized.

In addition to the antioxidant of the instant invention, other heat stabilizers and light stabilizers for ABS polymers can be incorporated, such as, the polyphosphates and polyhydric polycyclic phenols disclosed in U.S. Pat. No. 3,472,813, patented Oct. 14, 1969, to Hecker and Abramoff.

The stabilizer is incorporated in the ABS polymer in suitable mixing equipment, such as a mill, a Banbury mixer, an extruder, and the like.

The stabilized ABS polymer can be worked into the desired shape at elevated temperature by milling, calendering, extrusion or injection molding, or fiber molding.

The antioxidants of the invention can also be used with any halogen-containing resin, such as polyvinyl chloride resin. The term "polyvinyl chloride" as used herein is inclusive of any polymer formed at least in part of the recurring group:

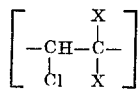

and having a chlorine content in excess of 40 percent. In this group, the X groups can each be either hydrogen or chlorine. In polyvinyl chloride homopolymers, each of the X groups is hydrogen. Thus, the term includes not only polyvinyl chloride homopolymers, but also afterchlorinated polyvinyl chlorides as a class, for example, those disclosed in British U.S. Pat. No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, or ethylene. The invention also is applicable to mixtures of polyvinyl chloride in a major proportion with a minor proportion of other synthetic resins such as chlorinated polyethylene or a copolymer of acrylonitrile, butadiene and styrene.

The invention is of application to the stabilization of rigid polyvinyl chloride resin compositions, that is, resin compositions which are formulated to withstand high processing temperatures, of the order of 375°F., and higher, as well as to plasticized polyvinyl chloride resin compositions of conventional formulation where resistance to heat distortion is not a requisite. Conventional plasticizers well known to those skilled in the art can be employed such as, for example, dioctyl phthalate, octyl diphenyl phosphate and epoxidized soybean oil.

Particularly useful plasticizers are the epoxy higher esters having from twenty-two to one hundred fifty carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the expoxidized acid. Also useful are the epoxidized mixtures of higher fatty acid esters found in naturally-occurring oils such as epoxidized coconut oil and epoxidized tallow. Of thse, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The antioxidants of the invention can, if desired, be employed in conjunction with other stabilizers for polyvinyl chloride resins, although, in many cases, the stabilization imparted by the antioxidant will be sufficient.

As supplemental stabilizers, there can be employed metal salt stabilizers of the type described in the Leistner et al. U.S. Pat. Nos. 2,564,646 and 2,716,092 and other patents in the field. The metal salt stabilizer is a salt of polyvalent metal and an organic acid having from six to twenty carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulfur, and hydroxyl. The oxygen-containing heterocyclic acids include oxygen and carbon in the ring structure, of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, hydroxy stearic acid, palmitic acid, oleic acid, myristic acid, dodecyl thioether propionic acid ($C_{12}H_{25}$—S—$(CH_2)_2$)—COOH), hexahydrobenzoic acid, benzoic acid, phenylacetic acid, isobutyl benzoic acid, isopropyl benzoic acid, ricinoleic acid, p-t-butylbenzoic acid, n-hexyl benzoic acid, salicyclic acid, naphthoic acid, 1-naphthalene acetic acid, orthobenzoyl benzoic acid, naphthenic acids derived from petroleum abietic acid, dihydroabietic acid, methyl furoic acid, and half esters of dicarboxylic acids with alcohols and polyols, such as monooctyl maleate half-esters. These are used in the form of their metal salts, particularly the alkaline earth metal salts, such as magnesium, barium, strontium and calcium, and the zinc, cadmium, lead and tin salts. Where these salts are not known, they are made by the usual types of reactions, such as by mixing the acid, or anhydride with the corresponding oxide or hydroxide of the metal in a liquid solvent, and heating, if necessary, until salt formation is complete. The barium, cadmium and zinc compounds are preferred.

Also effective stabilizers are organic compounds containing at least one epoxy group. These compounds can be used to supplement the essential stabilizers. The amount can range from 0 to 100 parts by weight per 100 parts of resin, depending upon the effect desired, for many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic, and alicyclic groups can also be present. The compounds have from ten to one hundred fifty carbon atoms. The longer chain aliphatic compounds of twenty-two carbon atoms and more are also plasticizers.

Typical epoxy compounds that are not plasticizers are epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3-epoxypropoxy)benzene, 4,4'-bis(2,3-epoxypropoxy) diphenyl ether, 1,8-bis(2,3-epoxypropoxy) octane, 1,4-bis-(2,3-epoxypropoxy) cyclohexane, and 1,3-bis(4,5-epoxypentoxy) 5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2'-bis(4-hydroxyphenyl) propane (Bisphenol A), 2,2'-bis (4-hydroxyphenyl) butane, 4,4'-dihydroxy-benzophenone and 1,5-dihydroxy naphthalene with halogen-containing epoxides such as 3-chloro-1,2-epoxybutane, 3-chloro-1,2-epoxyoctane, and epichlorhydrin. Typical epoxy compounds that combine stabilizing with plasticizing action are listed above under plasticizers.

A total of from 0.1 to 10 parts by weight of the stabilizers can be used for each 100 parts by weight of the resin. More stabilizer composition can be used, but usually no better results are obtained, and therefore such amounts are uneconomical and wasteful. The proportion of phosphite stabilizer added can be from 0.1 to 10 parts by weight but is preferably from 0.5 to 5 parts.

A small amount, usually not more than 1.5 percent, of a parting agent also can be included. Typical parting agents are the higher aliphatic acids having from twelve to twenty-four carbon atoms such as stearic acid, lauric acid, palmitic acid and myristic acid, mineral lubricating oils, polyvinyl stearate, polyethylene, paraffin wax and oxidized Montan wax derivatives.

The preparation of the stabilized composition is easily accomplished by conventional procedures. The selected stabilizer combination ordinarily is mixed with the plasticizer, if any, and this then is blended with the polyvinyl chloride resin, using, for instance, plastic mixing rollers at a temperature at which the mix is fluid and thorough blending facilitated, milling the plasticizer and stabilizer with the resin on a two-roll mill at from 250° to 350°F., for a time sufficient to form a homogeneous sheet, three to five minutes, usually. After the mass is uniform, it is sheeted off in the usual way.

The following Examples in the opinion of the inventors represent preferred embodiments of ABS-polyvinyl chloride resin compositions of their invention;

EXAMPLES 6 TO 14

A series of ABS-polyvinyl chloride homopolymer formulations was prepared, having the following composition:

|  | Parts by Weight |
| --- | --- |
| Polyvinyl chloride resin | 80 |
| ABS resin | 20 |
| Dioctylphthalate | 30 |
| Cd octoate | 0.7 |
| Ba-nonylphenate | 0.7 |
| Antioxidant | 2.0 |

The ABS polymer used was a polymer from a mixture composed of 27 percent acrylonitrile, 20 percent butadiene, and 53 percent styrene. The stabilizers were then weighed and dispersed in the unstabilized ABS-polyvinyl chloride polymer on a two-roll mill, and fluxed at from 145° to 150°C., for from two to three minutes. The milled sheets were smooth, and had glossy surfaces. Pieces cut from the milled sheets were then molded at 210°C., under a presusre of 50 kg. per sq. cm. for ten minutes, to form films 100–200 mm. × 2 mm.

Heat stability was determined by heating the films in an oven at 175°C. for up to two hours, or until discoloration set in. The results obtained appear in Table II.

TABLE II

| Example number | Antioxidant | Heat stability (minutes) |
| --- | --- | --- |
| Control | None | 60 |
| 6 | [structural formula: bis-phenol bearing t-C$_4$H$_9$ groups linked via —C$_2$H$_4$COOC$_2$H$_4$—N< to an isocyanurate ring, with three HO—C$_6$H$_2$(t-C$_4$H$_9$)$_2$—C$_2$H$_4$OCOC$_2$H$_4$— arms] | >120 |

Table II—Continued

| Example number | Antioxidant | Heat stability (minutes) |
|---|---|---|
| 7 | [structure: 3,5-di-t-butyl-4-hydroxyphenyl-C₂H₄COOC₂H₄-N linked to isocyanurate ring with another similar arm and N-C₂H₄OH substituent] | 110 |
| 8 | [structure: 3,5-di-t-butyl-4-hydroxyphenyl-C₂H₄COOC₂H₄-N linked to isocyanurate ring with two N-C₂H₄OH substituents] | 105 |
| 9 | [structure: triazine ring with three -NHCH₂OOCC₂H₄-(3,5-di-t-butyl-4-hydroxyphenyl) arms] | >120 |
| 10 | [structure: triazine with HO-CH₂NH- substituent and two -NHCH₂OCOC₂H₄-(3,5-di-t-butyl-4-hydroxyphenyl) arms] | >120 |
| 11 | [structure: triazine with two HO-CH₂NH- substituents and one -NHCH₂OOCC₂H₄-(3,5-di-t-butyl-4-hydroxyphenyl) arm] | 110 |
| 12 | [structure: triazine with methyl substituent and two -NHCH₂OCOC₂H₄-(3-t-butyl-5-methyl-4-hydroxyphenyl) arms] | 100 |
| 13 | [structure: triazine with three -NHCH₂OCOC₂H₄-(3-t-butyl-5-methyl-4-hydroxyphenyl) arms] | 105 |

| Example number | Antioxidant | Heat stability (minutes) |
|---|---|---|
| 14 | (structure shown) | 110 |

The data show the effectiveness of these antioxidants with both ABS resin and polyvinyl chloride.

The antioxidants of the invention are also useful stabilizers for synthetic rubbers.

The synthetic rubbers which may be stabilized in accordance with this invention are the rubbery diene polymers consisting predominantly of a polymerizable conjugated diolefin having four to six carbon atoms, e.g., 1,3-butadiene, isoprene, 2,3-dimethylbutadiene, 2-chlorobutadiene-1,3, piperylene, 2-methylpentadiene-1,3 and the like; hence synthetic rubbers of the above class include polymers of these materials and also copolymers prepared by the polymerization of monomer mixtures comprising a major proportion of such a polymerizable diolefin and also containing a minor proportion of such a polymerizable diolefin and also containing a minor proportion of other monoethylenically unsaturated compounds copolymerizable with the diolefin such as methyl acrylonitrile, methyl methacrylate, styrene, alpha methyl styrene, vinyl naphthalene, vinyl ketones, vinyl ketones, vinylidene chloride, diethyl fumarate, vinyl pyridine, and the like. Natural vulcanized rubber is also stabilized by the antioxidants of this invention.

The incorporation of the antioxidants with the synthetic rubber may be carried out simply by adding the compound either in the pure form or in solution, suspension or emulsion to the solid synthetic rubber in a water dispersion, or during the milling operation, or to a latex containing the synthetic rubber dispersed in an aqueous medium such as is ordinarily obtained by an emulsion polymerization process.

A sufficient amount of the antioxidant of the invention is used to enhance the resistance of the rubbery diene polymer against discoloration upon exposure to elevated temperatures. Small amounts are usually adequate. Amounts within the range from about 0.1 to about 10 percent by weight of the polymer are satisfactory. Preferably, from about 0.25 to about 2 percent is employed for optimum stabilization.

The following Examples in the opinion of the inventors represent preferred embodiments of rubbery diene polymer compositions of this invention.

EXAMPLES 15 to 19

A series of synthetic rubber compositions was prepared according to the following formulation:

|  | Parts by Weight |
|---|---|
| Styrene-Butadiene copolymer | 100 |
| Stearic acid | 1 |
| Zinc White | 5 |
| "White Carbon" (silica) | 50 |
| Diethylene glycol | 2 |
| Sulfur | 2 |
| Plasticizer (hydrocarbon) | 5 |
| Benzothiazyl disulfide | 2 |
| Tetramethyl thiuramdisulfide | 0.1 |
| Antioxidant | 2 |

The compositions were milled on a three-roll mill, and sheeted off and then vulcanized at 150°C. The tensile strength and elongation were then measured. The test compositions next were aged in an air-circulating oven at 100°C. for 20 hours, and then tensile strength and elongation were again measured. The difference between the original tensile strength and elongation retained by the material was then calculated. The results are given in the Table III below:

TABLE III

| Example number | Antioxidant | Percent retention of— Tensile strength | Elongation |
|---|---|---|---|
| Control | None | 43 | 52 |
| 15 | (structure shown) | 75 | 71 |

TABLE III—Continued

| Example number | Antioxidant | Percent retention of— | |
|---|---|---|---|
| | | Tensile strength | Elongation |
| 16 | [structure] | 73 | 66 |
| 17 | [structure] | 67 | 70 |
| 18 | [structure] | 68 | 75 |
| 19 | [structure] | 62 | 78 |

The data show the effectiveness of these antioxidants in improving resistance to oxidative deterioration of synthetic rubbers under accelerated oxidative conditions.

All percentages in the claims are by weight of the polymer.

Having regard to the foregoing disclosure, the following is claimed as the inventive and patentable embodiments thereof:

1. A polyvinyl chloride resin composition having improved resistance to deterioration when heated at 350°F., comprising a polyvinyl chloride resin formed at least in part of the recurring group

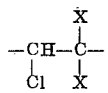

and having a chlorine content in excess of 40 percent, where X is either hydrogen or chlorine; and from about 0.001 to about 5 percent by weight of an ortho-substituted hydroxyphenyl-alkylene carboxyalkylene-1,3,5-triazine having the general formula:

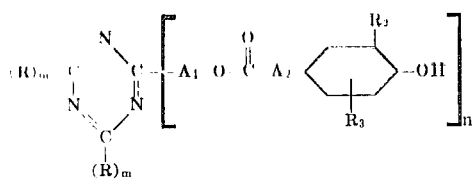

wherein:

$n$ is an integer from 1 to 3;

$m$ is an integer from 0 to 2;

$A_1$ is selected from the group consisting of alkylene having from one to about four carbon atoms and alkyl alkylene, the alkyl having from one to about fourteen carbon atoms and the alkylene having from one to about four carbon atoms, and amino $NHA_3$, wherein $A_3$ is selected from the group consisting of alkylene having from one to about four carbon atoms and alkyl alkylene, the alkyl having from one to about fourteen carbon atoms and the alkylene having from one to about four carbon atoms;

$A_2$ is alkylene having from one to about four carbon atoms;

$R_2$ and $R_3$ are selected from the group consisting of hydrogen and alkyl having from one to about four carbon atoms; $R_2$ is ortho to the hydroxyl, and $R_3$ can be ortho or meta to the hydroxyl;

R is linked to carbon and is selected from the group consisting of oxo, alkyl, aryl, cycloalkyl and hydroxy alkyl, and $NHR_1$, $R_1$ being selected from the group consisting of alkyl, cycloalkyl or hydroxyalkyl;

the R alkyl groups having from one to about eighteen carbon atoms, the R cycloalkyl groups having from three to about eight ring carbon atoms, any remaining carbon atoms being in alkyl substituents attached to the ring, the R aryl groups having six carbon atoms, ten carbon atoms, and fourteen carbon atoms.

2. A polyvinyl chloride resin composition in accordance with claim 1, in which the polyvinyl chloride resin is polyvinyl chloride homopolymer.

3. A polyvinyl chloride resin composition in accordance with claim 1, in which the polyvinyl chloride resin is a copolymer of vinyl chloride and vinyl acetate.

4. A polyvinyl chloride resin composition in accordance with claim 1, including an organic vicinal epoxy compound having from about ten to about one hundred fifty carbon atoms.

5. A polyvinyl chloride resin composition in accordance with claim 1, including a salt of a polyvalent metal and an organic nonnitrogenous monocarboxylic acid having from about eight to about twenty carbon atoms.

6. An olefin polymer composition having improved resistance to deterioration comprising an olefin polymer selected from the group consisting of polymers of alpha-olefins having from two to six carbon atoms and polystyrene, and from about 0.001 to about 5 percent by weight of a hydroxyphenyl-1,3,5-triazine having the general formula:

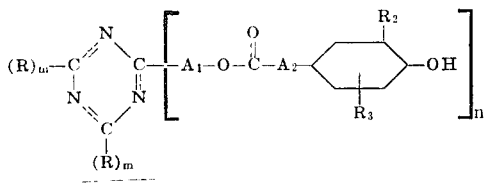

wherein:
$n$ is an integer from 1 to 3;
$m$ is an integer from 0 to 2;
$A_1$ is selected from the group consisting of alkylene having from one to about four carbon atoms and alkyl alkylene, the alkyl having from one to about fourteen carbon atoms and the alkylene having from one to about four carbon atoms, and imino $NHA_3$, wherein $A_3$ is selected from the group consisting of alkylene having from one to about four carbon atoms and alkyl alkylene, the alkyl having from one to about fourteen carbon atoms and the alkylene having from one to about four carbon atoms;
$A_2$ is alkylene having from one to about four carbon atoms;
$R_2$ and $R_3$ are selected from the group consisting of hydrogen and alkyl having from one to about four carbon atoms; $R_2$ is ortho to the hydroxyl, and $R_3$ can be ortho or meta to the hydroxyl;
R is linked to carbon and is selected from the group consisting of oxo, alkyl, aryl, cycloalkyl and hydroxy alkyl, and $NHR_1$, $R_1$ being selected from the group consisting of alkyl, cycloalkyl or hydroxyalkyl;
the R alkyl groups having from one to about eighteen carbon atoms, the R cycloalkyl groups having from three to about eight ring carbon atoms, any remaining carbon atoms being in alkyl substituents attached to the ring, the R aryl groups having six carbon atoms, ten carbon atoms, and fourteen carbon atoms.

7. An olefin polymer composition in accordance with claim 6, wherein the polyolefin is polypropylene.

8. An acrylonitrile-butadiene-styrene polymer having its resistance to deterioration when heated at 300°F. and above enhanced by from about 0.001 to about 5 percent by weight of an ortho-substituted hydroxyphenyl-alkylene carboxylalkylene-1,3,5-triazine having the general formula:

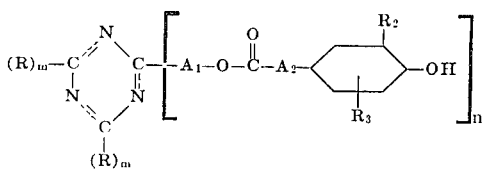

wherein:
$n$ is an integer from 1 to 3;
$m$ is an integer from 0 to 2;
$A_1$ is selected from the group consisting of alkylene having from one to about four carbon atoms and alkyl alkylene, the alkyl having from one to about fourteen carbon atoms and the alkylene having from one to about four carbon atoms, and imino $NHA_3$, wherein $A_3$ is selected from the group consisting of alkylene having from one to about four carbon atoms and alkyl alkylene, the alkyl having from one to about fourteen carbon atoms and the alkylene having from one to about four carbon atoms;
$A_2$ is alkylene having from one to about four carbon atoms;
$R_2$ and $R_3$ are selected from the group consisting of hydrogen and alkyl having from one to about four carbon atoms; $R_2$ is ortho to the hydroxyl, and $R_3$ can be ortho or meta to the hydroxyl;
R is linked to carbon and is selected from the group consisting of oxo, alkyl, aryl, cycloalkyl and hydroxy alkyl, and $NHR_1$, $R_1$ being selected from the group consisting of alkyl, cycloalkyl or hydroxyalkyl;
the R alkyl groups having from one to about eighteen carbon atoms, the R cycloalkyl groups having from three to about eight ring carbon atoms, any remaining carbon atoms being in alkyl substituents attached to the ring, the R aryl groups having six carbon atoms, ten carbon atoms, and fourteen carbon atoms.

9. A synthetic rubbery diene polymer composition having improved resistance to deterioration comprising a rubbery diene polymer and a hydroxyphenyl-1,3,5-triazine having the general formula:

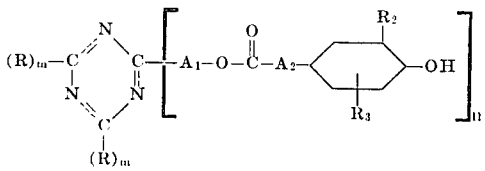

wherein:
$n$ is an integer from 1 to 3;
$m$ is an integer from 0 to 2;
$A_1$ is selected from the group consisting of alkylene having from one to about four carbon atoms and alkyl alkylene, the alkyl having from one to about fourteen carbon atoms and the alkylene having from one to about four carbon atoms, and imino $NHA_3$, wherein $A_3$ is selected from the group consisting of alkylene having from one to about four carbon atoms and alkyl alkylene, the alkyl having from one to about fourteen carbon atoms and the alkylene having from one to about four carbon atoms;

$A_2$ is alkylene having from one to about four carbon atoms;

$R_2$ and $R_3$ are selected from the group consisting of hydrogen and alkyl having from one to about four carbon atoms; $R_2$ is ortho to the hydroxyl, and $R_3$ can be ortho or meta to the hydroxyl;

R is linked to carbon and is selected from the group consisting of oxo, alkyl, aryl, cycloalkyl and hydroxy alkyl, and $NHR_1$, $R_1$ being selected from the group consisting of alkyl, cycloalkyl or hydroxyalkyl;

the R alkyl groups having from one to about eighteen carbon atoms, the R cycloalkyl groups having from three to about eight ring carbon atoms, any remaining carbon atoms being in alkyl substituents attached to the ring, the R aryl groups having six carbon atoms, ten carbon atoms, and fourteen carbon atoms.

* * * * *

UNITED STATES PATENT OFFICE
CERTIFICATE OF CORRECTION

Patent No. 3,869,423      Dated March 4, 1975

Inventor(s) Motonobu Minagawa et al

It is certified that error appears in the above-identified patent and that said Letters Patent are hereby corrected as shown below:

Column 3, line 44 :

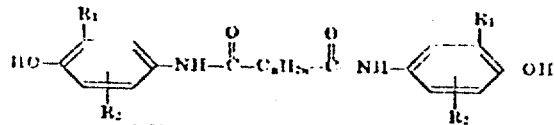

should be

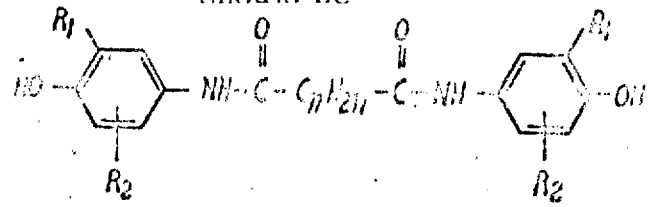

| | | |
|---|---|---|
| Column 4, line 7 | : | "accelarates" should be --accelerates-- |
| Column 4, line 13 | : | "Hensen" should be --Hansen-- |
| Column 4, line 21 | : | "Hanson" should be --Hansen-- |
| Column 4, line 25 | : | "Sterinberg" should be --Steinberg-- |
| Column 5, line 25 | : | please insert after " $NR_4$" --where $R_4$-- |
| Column 5, line 31 | : | "have" should be --having-- |

Page 2 of 9

UNITED STATES PATENT OFFICE
CERTIFICATE OF CORRECTION

Patent No. 3,869,423  Dated March 4, 1975

Inventor(s) Motonobu Minagawa et al

It is certified that error appears in the above-identified patent and that said Letters Patent are hereby corrected as shown below:

<u>Column 9, Formula 9</u>

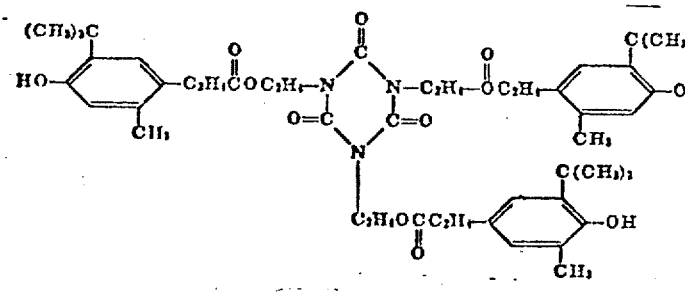

should be

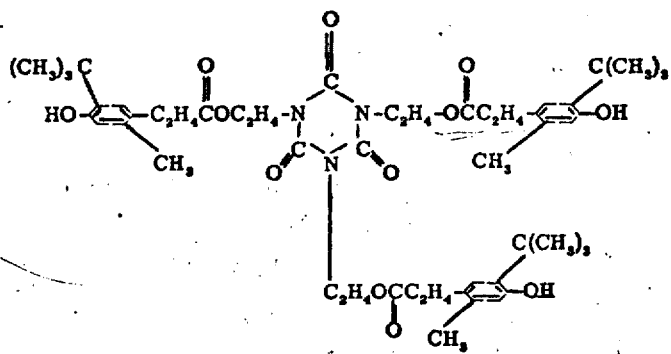

UNITED STATES PATENT OFFICE
CERTIFICATE OF CORRECTION

Patent No. 3,869,423          Dated March 4, 1975

Inventor(s) Motonobu Minagawa et al

It is certified that error appears in the above-identified patent and that said Letters Patent are hereby corrected as shown below:

Column 10, Formula 12 :

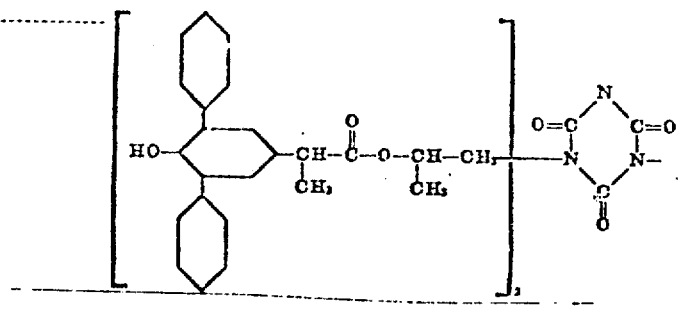

should be

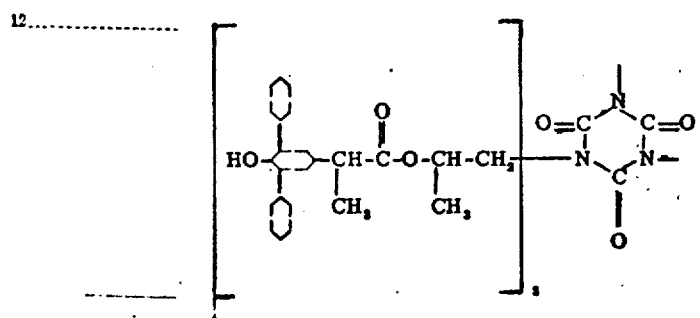

UNITED STATES PATENT OFFICE
CERTIFICATE OF CORRECTION

Patent No. 3,869,423            Dated March 4, 1975

Inventor(s) Motonobu Minagawa et al

It is certified that error appears in the above-identified patent and that said Letters Patent are hereby corrected as shown below:

Column 10, Formula 13 : 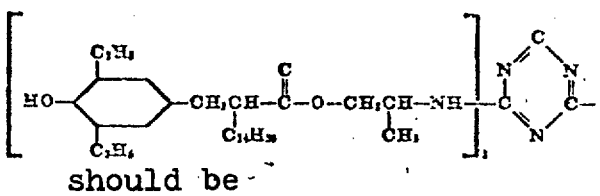

should be

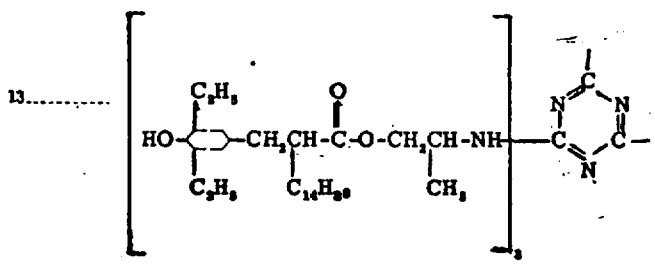

Column 14, line 38 : 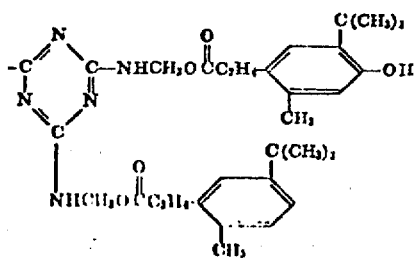

should be

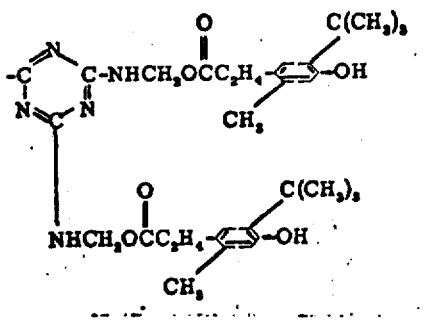

UNITED STATES PATENT OFFICE
CERTIFICATE OF CORRECTION

Patent No. 3,869,423     Dated March 4, 1975

Inventor(s) Motonobu Minagawa et al

It is certified that error appears in the above-identified patent and that said Letters Patent are hereby corrected as shown below:

Column 15, line 17 : "stryene" should be --styrene--

Column 17, line 24 : "bias" should be --bis--

Column 17, line 45 : "isooctyll" should be --isooctyl--

Column 21, Table 1, Formula 3:

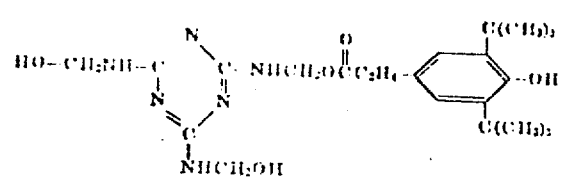

should be

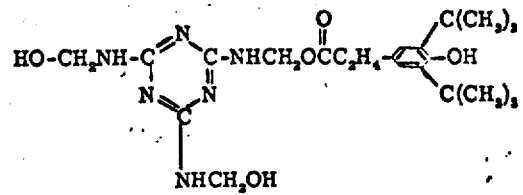

Column 23, line 40 : "performed" should be --preformed--

Column 26, line 30 : "expoxidized" should be --epoxidized--

Column 26, line 52 : " alicylic" should be --alicyclic--

Column 26, line 67 : "salicyclic" should be --salicylic--

UNITED STATES PATENT OFFICE
CERTIFICATE OF CORRECTION

Patent No. 3,869,423  Dated March 4, 1975

Inventor(s) Motonobu Minagawa et al

It is certified that error appears in the above-identified patent and that said Letters Patent are hereby corrected as shown below:

Column 30, Table II, Formula 13 :

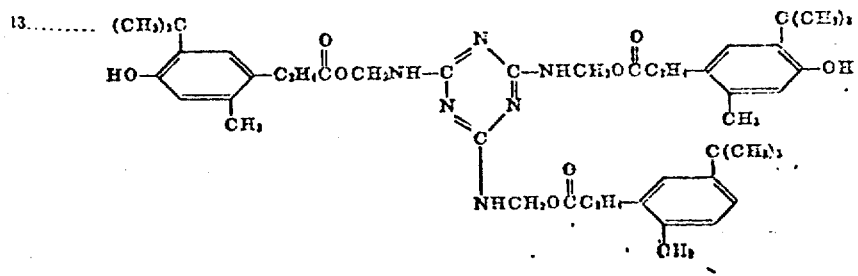

should be

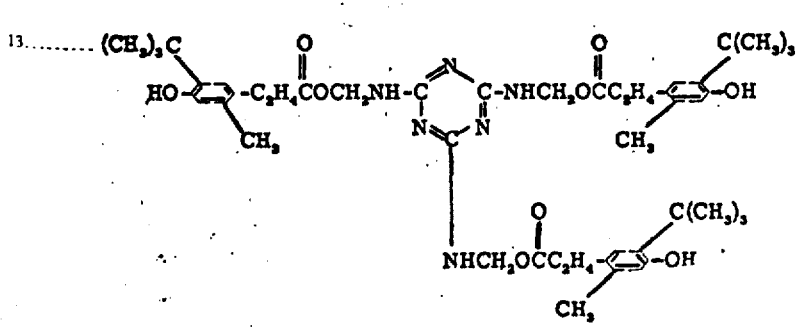

UNITED STATES PATENT OFFICE
CERTIFICATE OF CORRECTION

Patent No. 3,869,423          Dated March 4, 1975

Inventor(s) Motonobu Minagawa et al

It is certified that error appears in the above-identified patent and that said Letters Patent are hereby corrected as shown below:

Column 32, Table II, Formula 14 :

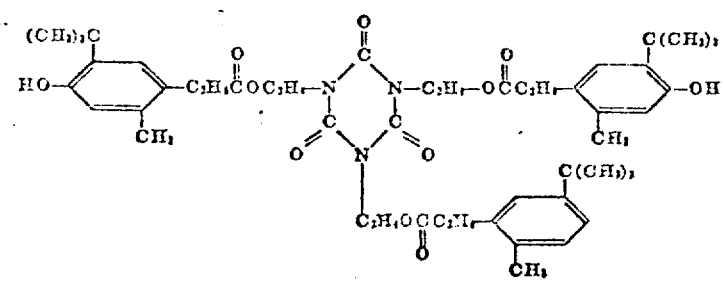

should be

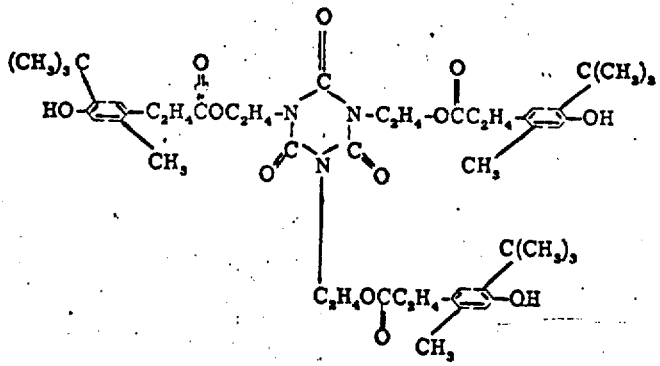

UNITED STATES PATENT OFFICE
CERTIFICATE OF CORRECTION

Patent No. 3,869,423  Dated March 4, 1975

Inventor(s) Motonobu Minagawa et al

It is certified that error appears in the above-identified patent and that said Letters Patent are hereby corrected as shown below:

Column 32, Table III, Formula 15 :

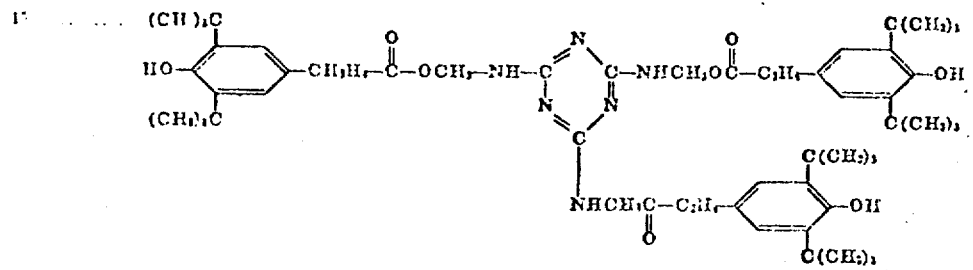

should be

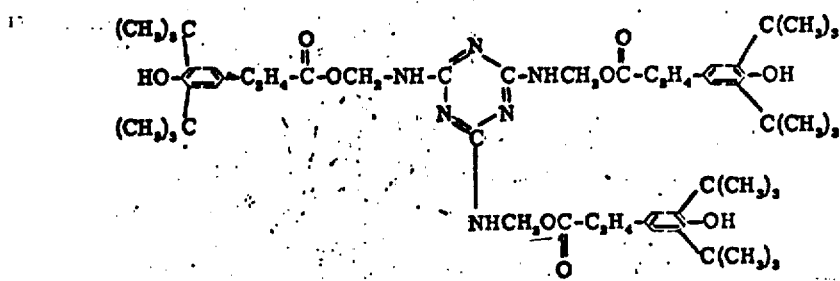

UNITED STATES PATENT OFFICE
CERTIFICATE OF CORRECTION

Patent No. 3,869,423          Dated March 4, 1975

Inventor(s) Motonobu Minagawa et al

It is certified that error appears in the above-identified patent and that said Letters Patent are hereby corrected as shown below:

Column 33, Claim 1, line 65 :

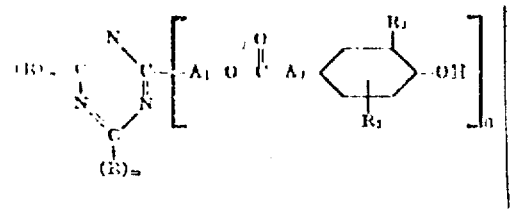

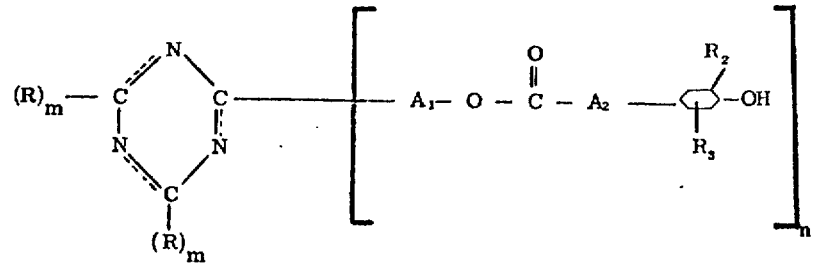

Column 34, line 48        :  "amino" should be --imino--

Columns 35 and 36         :  Are in the patent twice. Please delete second one

Signed and Sealed this

Sixth Day of July 1976

[SEAL]

Attest:

RUTH C. MASON
*Attesting Officer*

C. MARSHALL DANN
*Commissioner of Patents and Trademarks*